United States Patent Office.

FELIX GLOBOTSCHNIG, OF BOLOGNA, ITALY, ASSIGNOR OF ONE-HALF TO MORITZ MÜLLER, JR., OF VIENNA, AUSTRIA.

PROCESS OF TREATING THE PLANT GENISTA TO OBTAIN FIBERS.

SPECIFICATION forming part of Letters Patent No. 284,291, dated September 4, 1883.

Application filed July 6, 1883. (No specimens.) Patented in Germany November 23, 1882, No. 22,523, and in Austria-Hungary February 10, 1883, No. 38,923 and No. 4,366.

*To all whom it may concern:*

Be it known that I, FELIX GLOBOTSCHNIG, of Bologna, in the Kingdom of Italy, have invented certain new and useful Improvements in the Process of Treating the Plant Genista to Obtain Fibers, (for which Letters Patent have heretofore been granted to Moritz Müller as my assignee by the government of Germany, No. 22,523, dated November 23, 1882, and Austria-Hungary, Nos. 38,923 and 4,366, dated February 10, 1883,) of which the following is a specification.

The object of my invention is to treat and prepare the plants of the species *Genista L.* in such a manner as to utilize the fibers of the same in the arts. The fibers of these plants, if properly treated, can be used in place of hemp or flax, as the fiber is much stronger than hemp, and has the advantage that ropes made therefrom acquire greater strength when exposed to moisture, instead of becoming weaker and rotten, as is the case with hemp under similar circumstances. Besides the fiber the refuse or woody part can be used off for making cellulose, that is adapted, owing to its strong texture, for the manufacture of stout paper. The fibers obtained from this plant may be also bleached, and may be successfully spun and woven for use in the arts. The species *Genista L.* is found growing in most all parts of the world. It is cut, when full grown, close to the root, from which, in the year following, will shoot up a large number of small branches, so that the original single stem will produce up to twenty-five smaller stems or branches, and if cut every year the root of the plant will, after six or seven years, gain a very deep and firm hold in the ground, and will attain a thickness of up to three inches, while the branches keep getting juicier and develop more and more fibers, which are separated from the woody portion by the following process: The plants are, preferably in small bunches, placed into a tank or vessel filled with water, which is raised to boiling-heat. To this water is added, either before or during the boiling, lye in proportion of about thirty to sixty pounds to eight hundred pounds of the plants. The lye may be added to the water as such, already prepared, or caustic alkaline earths, in combination with carbonates of alkalies, may be employed, which form the lye in the water containing the plants. I employ, by preference, carbonate of lime and carbonate of soda in proportion of about thirty to forty pounds of lime and eight to twelve pounds of soda for eight hundred pounds of plants. In this lye the plants are boiled for about five or six hours, after which they are left to cool, and are then removed from the tank or boiler. The plants are then ready to undergo the same treatment as flax and hemp—viz., they may be steeped, dried, broken, and combed, to be subsequently employed for spinning, weaving, making cordage, yarn, and for other purposes to be used in place of hemp, flax, jute, or similar plants. From the waste and residue of the plants cellulose for the manufacture of paper may be made by any of the known processes.

Having thus described my invention, I claim as new and desire to secure by Letters Patent—

The process herein described of treating the plant *Genista L.* so as to utilize fibers of the same in the arts, which consists in boiling the stems or branches of the genista plants in water, to which lye or lye-forming alkalies have been added, and subsequently treating said branches by steeping, drying, breaking, and combing, substantially as set forth.

In testimony that I claim the foregoing as my invention I have signed my name in presence of two subscribing witnesses.

FELIX GLOBOTSCHNIG.

Witnesses:
EMILIO MASI,
VINCENZO MASI.